United States Patent [19]
Bertels

[11] Patent Number: 4,724,293
[45] Date of Patent: Feb. 9, 1988

[54] METHOD OF MAKING A PRESSURE VESSEL

[75] Inventor: Augustinus W. M. Bertels, Arnhem, Netherlands

[73] Assignee: Nagron Steel & Aluminium, Netherlands

[21] Appl. No.: 747,964

[22] Filed: Jun. 24, 1985

[30] Foreign Application Priority Data

Jun. 28, 1984 [NL] Netherlands ............... 8402065

[51] Int. Cl.⁴ .................. B23K 11/32; B23K 11/36
[52] U.S. Cl. ............................ 219/78.12; 219/117.1
[58] Field of Search ............... 220/71, 72; 215/1 C; 219/78.12, 78.11, 78.01, 82, 83, 91.2, 117.1; 228/181–184

[56] References Cited

U.S. PATENT DOCUMENTS

| | | | |
|---|---|---|---|
| 1,042,885 | 10/1912 | Budd et al. | 219/117.1 X |
| 1,757,923 | 5/1930 | Russell | 220/71 |
| 2,407,455 | 9/1946 | Shakesby | 220/71 |
| 2,876,333 | 3/1959 | Argentin | 219/78.12 X |
| 2,926,761 | 3/1960 | Herbert | 219/78.12 X |
| 3,474,927 | 10/1969 | Bowles | 215/1 C |
| 3,552,599 | 1/1971 | Redding | 220/72 |
| 3,940,002 | 2/1976 | Schiemam | 215/1 C |
| 4,274,548 | 6/1981 | Schneider | 220/72 |

FOREIGN PATENT DOCUMENTS

| | | | |
|---|---|---|---|
| 273402 | 10/1964 | Australia | 220/71 |
| 2723515 | 11/1978 | Fed. Rep. of Germany | 220/72 |
| 168118 | 4/1951 | German Democratic Rep. | 219/78.12 |
| 6516272 | 5/1967 | Netherlands | 220/71 |
| 499366 | 1/1939 | United Kingdom | 220/71 |
| 793732 | 1/1981 | U.S.S.R. | 219/83 |

OTHER PUBLICATIONS

Lyman, T. et al. *Metals Handbook* 8 ed, Metals Park Ohio: American Society Fn Metals, 1971, pp. 425–430.

*Primary Examiner*—E. A. Goldberg
*Assistant Examiner*—C. M. Sigda
*Attorney, Agent, or Firm*—John P. Snyder

[57] ABSTRACT

In making a pressure vessel, spaced electrically conducting plates are separated by a pattern of electrically conducting tensile members which are held in that pattern by separable electrically conducting casing halves made of material which will not spot weld to the plates, the plates are forcibly engaged against the opposite ends of the tensile members and opposite ends of the casing halves while welding current is passed through and between the plates, and then the casing halves are removed whereafter marginal edges of the plates are joined by welding.

8 Claims, 13 Drawing Figures

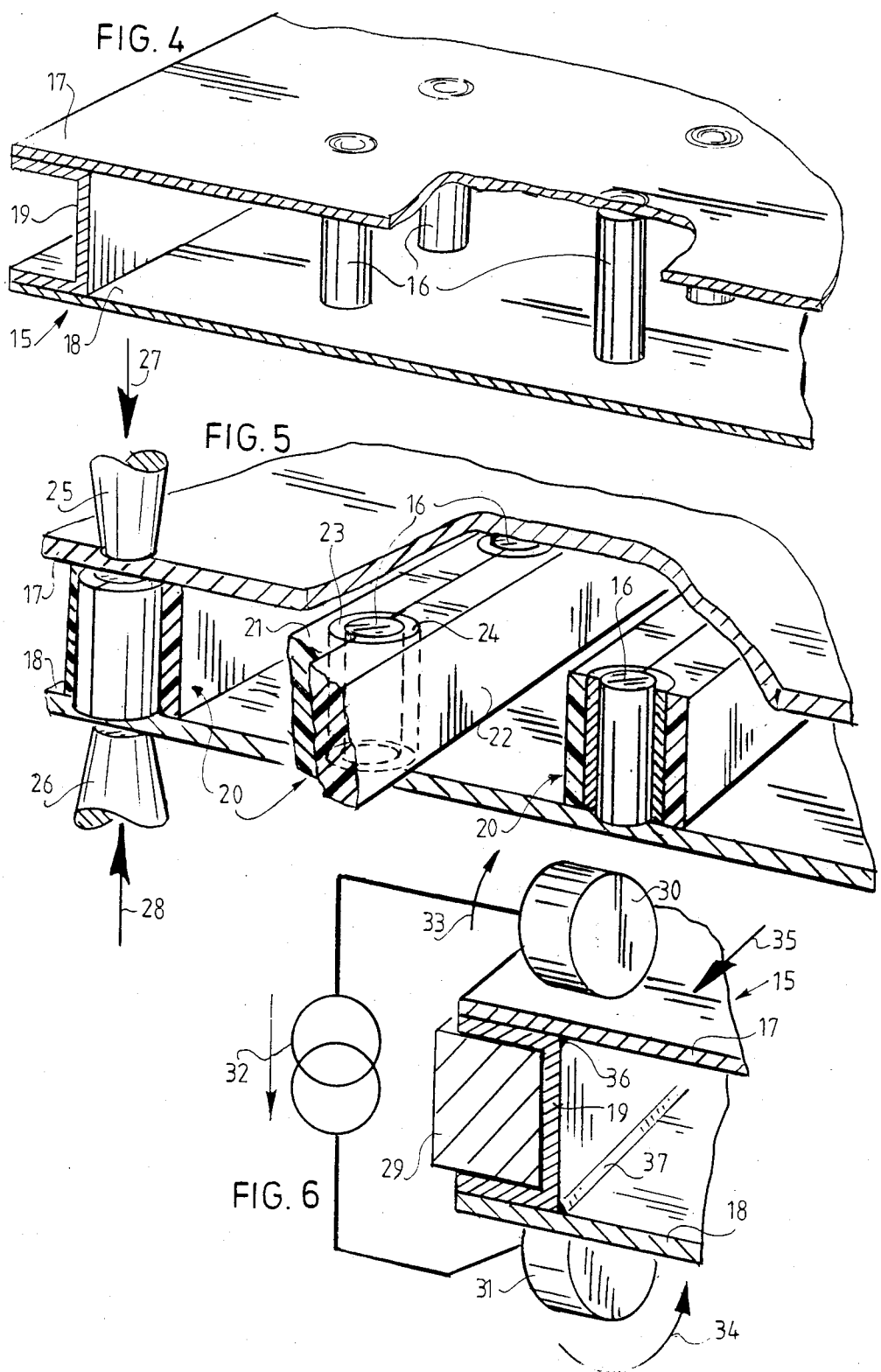

METHOD OF MAKING A PRESSURE VESSEL

The invention relates to a storage vessel for fluid under pressure. The use of a cylindrical vessel with generally semi-spherical end walls is known. Such a vessel displays a number of disadvantages and limitations.

It is not easily placed occupying little space, it is expensive in production and does not lend itself to thermic coupling with another vessel, unless recourse is had to relatively complicated and therefore expensive constructions. In addition the vessel has to be comparatively thick walled to be able to resist the internal pressure. It is so that, as the diameter becomes greater, the tensile stress in the wall increases under the influence of the internal pressure, an increase proportional to this internal pressure and to the internal diameter of the vessel. This means that larger vessels have to be proportionally thicker walled. As a guideline: a current thickness for a small pressure vessel is for example 4 mm, while the wall is manufactured from steel.

The end walls may not be flat, because flat end walls are not capable of sufficiently absorbing the internal pressure without displaying inadmissible elastic and/or plastic deformations.

The end walls have to be attached onto the cylindrical body by welding. This welding treatment is costly, because very strick safety requirements are applied to pressure vessels. In addition, inspection involves the use of X-ray techniques.

The manufacture of the cylindrical body is usually carried out using as a basis a flat plate which is bent, welded, rolled, soldered or the like.

The end walls can be pressed, ironed or, in case of larger walls, manufactured from portions.

Because of its form the known vessel cannot in general be placed easily and occupying little space, it is heavy and costly.

The invention has for its object to provide a storage vessel for fluid under pressure such that it does not display the said disadvantages of the known art.

Furthermore the invention has for its purpose to engineer a pressure vessel in such a way that it can be manufactured in practically any desired shape, for adaptation to the available, often capriciously shaped space, and furthermore in a simple way and cheaply. As an example in this connection reference is made to an airplane-wing-tank.

The making of double walled plate constructions in inherently flat form has already been proposed. Known, for example, is the connecting of two flat steel plates with each other at their edges, fluid tight and pressure resistant, subsequently applying a pattern of spot weld couplings between both plates, after which a fluid under very high pressure is brought between the plates, causing the construction to be, as it were, "blown up" so that a mattress shaped, more or less flat construction results.

The FIGS. 1 and 2 show this known technique.

FIG. 1 shows two plates 1, 2, which are connected as gas tight with each other by fold seam welding, as indicated by a broken line 3. The plates 1 and 2 are further connected with each other by a pattern of spot weld connections 4, as further indicated schematically with arrows 5. In the manner shown in FIG. 2 fluid under high pressure is then introduced via an opening 6, as shown with the arrow 7. As a result, the zones between the spot weld connections 4 are driven apart so that the more or less corrugated form results, which is clearly seen in the zone indicated by 8, the broken away portion of the perspective view as in FIG. 2, and which largely endows the construction with its rigidity.

The disadvantage of the construction obtained by this method is that, relative to its weight and its largest projected surface, it contains relatively little volume.

In view of the aforementioned drawbacks of the pressure vessel in flat and comparatively thin walled form, the invention proposes providing a storage vessel for fluid under pressure with at least one connecting element attached between two wall portions which is able to bear tensile stress. It is remarked that such a construction is not limited to flat pressure vessels, but lends itself to application in a much wider range of such vessels, for example parallelepipedal vessels, cube shaped vessels, polygonal vessels, vessels with curved wall portions etc.

Use can be made in particular of a number of connecting elements arranged in hexagonal patterns. Using these, the pressure zones between the connecting elements can become relatively small with the result that a still greater extent of limitation of the wall thickness of the pressure vessel can be attained. As a guideline it is remarked here that, in contrast to the aforementioned 4 mm of the known pressure vessel, in the vessel according to the invention a wall thickness in the order of magnitude of 0.4 mm can be applied, i.e. a wall thickness reduction by a factor of 10. It needs no argument that this considerably improves the maneuverability and the location potential of a vessel. For a larger vessel this factor becomes proportionally more favorable.

In a first embodiment, the storage vessel according to the invention displays the special feature that the, or each, connecting element is given the form of a plastic deformed convex zone, attached in both walls in a corresponding position, which convex zones are coupled with each other using that part directed towards the other. Such plastic deformed zones can be attached beforehand, for example by ironing. A restriction here is the limitation in the ironing potential. With ironing the wall thickness decreases, while moreover to achieve the desired height of the convex zones more than an ironing treatment is often necessary, which is time-consuming and costly. In addition this construction gives a relatively great loss in effective volume.

The convex zones can be connected with each other by various known methods. A very simple and reliable variant is that where the convex zones are welded to each other, in particular by spot welding. In order to eliminate the drawbacks of the form described above, use can, in preference, be made of a form in which the, or each, connecting element takes the form of plate, wire, rod or pipe. A very simple and cheap variant is that in which the connecting element is welded at its outer ends to both walls, in particular by spot welding.

The problem arises here that the electrical resistance of the rod or pipe can be a relatively important factor. The rod or pipe can become very hot without adhering to a sufficient extent to the walls as a result of welding, while in addition inadmissible deforming, upsetting and wrinkling can occur and there is moreover and inadmissible loss of electrical power. With this method the welding procedure, and as a result the quality of the resulting weld, is difficult or impossible to control.

To cope with this last mentioned problem, the invention further provides a method for manufacturing a storage vessel of the type previously discussed, according to which method a rod or pipe is clamped into an at least electrically conductive casing, the rod or pipe is connected to both walls by spot welding and finally the casing is removed. Apart from making the casing electrically conductive, whereby the resistance of the rod or pipe itself is a considerably less important factor, it can be advantageous to make it thermically conducting, which has a cooling effect on the connecting elements, which in turn contributes further to a good stability of form.

A variant where use does not need to be made of a welding procedure for the attaching of the connecting elements displays the feature that the, or each, connecting element and each of its outer ends co-operates with a locking member present on the associated wall and the element is rotatable round its longitudinal axis relative to said member between a locked position and a free position. In order to manufacture such a storage vessel it can be advantageous if the locking members are connected in some measure at least with the one wall, after which the second wall is placed and the connection with this wall can also be effected. Such a storage vessel displays the special feature that the free position of the, or each, connecting element in relation to the locking member for the one wall deviates from that for the other wall.

In the same context use can be made of a form where the, or each connecting element and each of its outer ends co-operates by means of snap couplings with a locking member present on the associated wall.

The invention further extends to an embodiment having pipes which serve as connecting elements, are made as heat exchanger and which are connectable.

The edges of in each case two walls which butt against each other can be advantageously connected to each other by welding. Use is preferably made in this context of an embodiment which displays the feature that adjoining edge zones of pairs of walls lie one on the other and are connected with each other by fold seam welding.

Depending on the fluid applied, it can be of advantage if the inner surface is coated with a corrosion preventing upper layer. Use can be made of an upper layer based on phenol-phenolepoxies. The problem here is that such material is very difficult to apply in more or less narrow grooves. In the manufacturing of a storage vessel it is therefore preferable that care is taken that these do not occur, or are still to be found in the finished vessel. The problem arises particularly with wall edges which butt against each other.

In the first place the invention provides a method which displays the special feature that two facing edge zones of a first wall are bent square, that on these bent edge zones the edge zones of two further walls lying mutually parallel are then placed, that a block which is at least electrically conducting is placed between the bent edge zones, that electrical current is subsequently transmitted via weld rollers which at least to some extent grip onto the two further plates on their free sides in the area of transition between their edge zones and their free surface, whereby, during the transmission of the current, the three plates and the weld rollers are moved relative to each other to effect the weld connection of the first plate with the two further plates, and that finally the conducting block is removed, which can be further elaborated in the sense that the speed of the relative movement between the weld rollers and the three walls and the path of these weld rollers are chosen on the basis of the thermic properties of the conducting block. This last elaboration has the particular advantage that a very smooth transition between the diverse parts can be obtained and that the upper layer can be applied with great reliability.

Finally the invention extends to an assembly of two or more storage vessels of the type specified. As a result of the thermic coupling of the constituent vessels, such an assembly can display the special feature that between the walls of adjoining vessels which are directed towards each other a layer of thermically conducting material is found which can conform to possible alterations in the form of the walls concerned, for example, powder, pellets, grinding chips, fibres, chips or the like of thermically conducting material, for example aluminium, magnesium, copper conductive types of glass or carbon. Such a thermically conducting intermediate layer also ensures a good thermic contact between the various vessels where alterations in form are caused by alterations in pressure. The invention will now be explained with reference to drawings of several arbitrary embodiments. In the drawings:

FIG. 4 shows a partially broken away perspective view of a detail from a second embodiment;

FIG. 5 shows a partially broken away perspective view of a detail making clear the method of manufacturing the vessel as in FIG. 4;

FIG. 6 shows a partial perspective view of the vessel as in FIG. 4 explaining the manufacture thereof;

Figure 1:
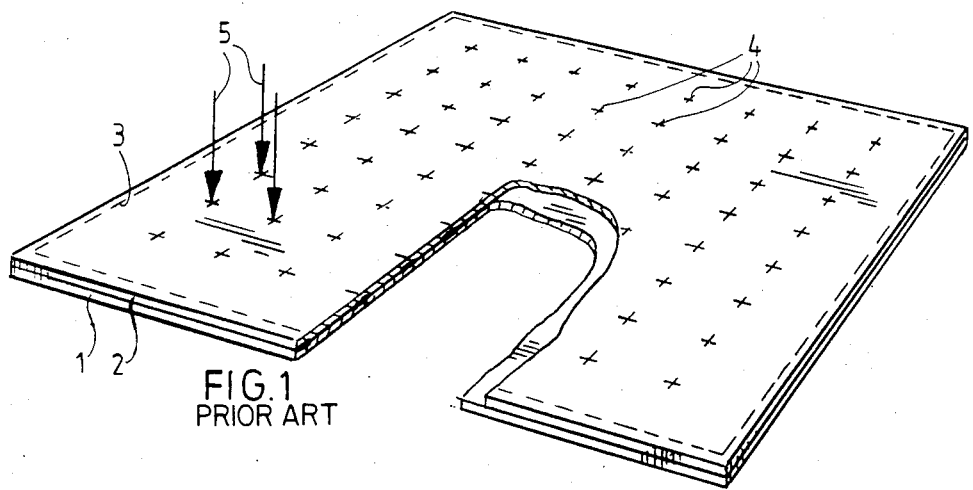
FIGS. 1 and 2 show two production phases of a known, flat heat storage vessel.
Figure 2:
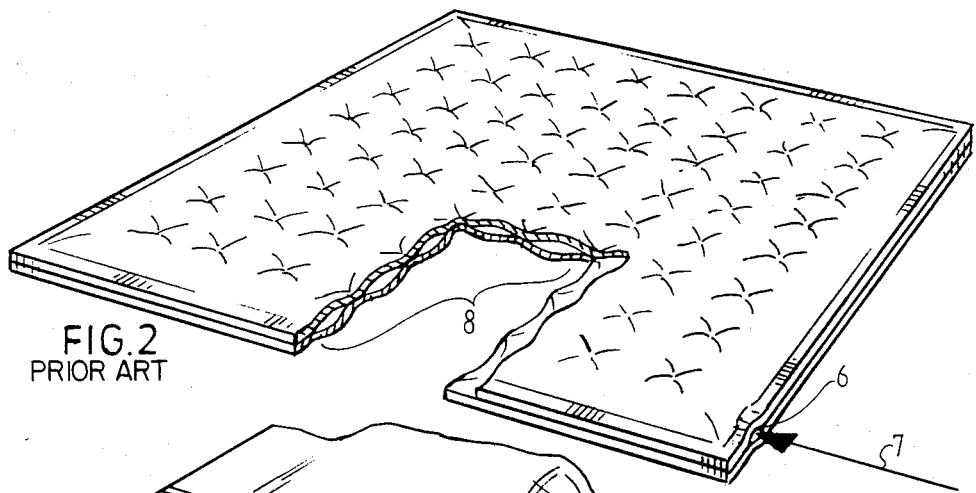
Figure 3:
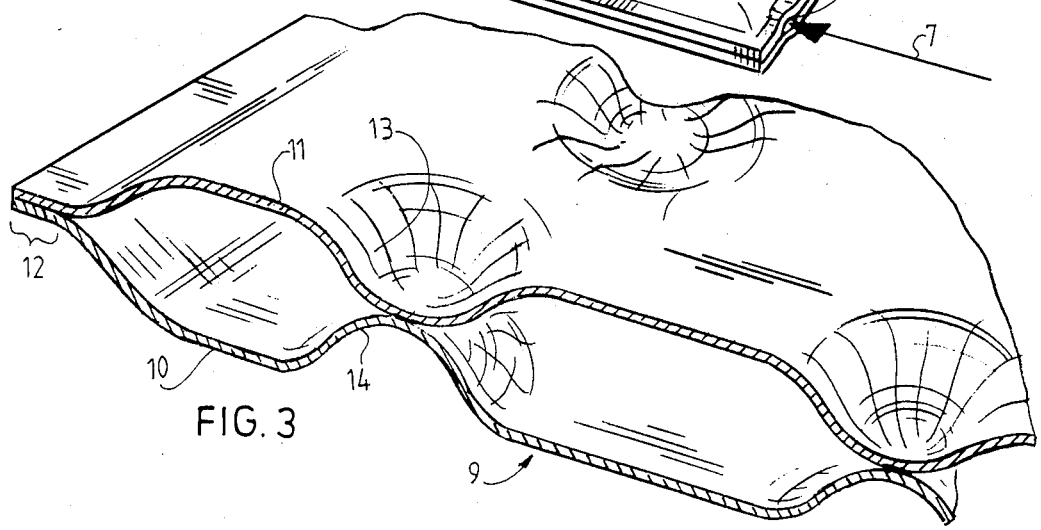
FIG. 3 shows a first embodiment of a vessel according to the invention.

FIG. 3 shows a first embodiment of a pressure vessel 9. This comprises two walls 10, 11, which are adhered to each other at their edges by fold seam welding, as indicated by the reference number 12. The walls 10, 11 are provided with convex parts 13, 14 directed towards each other, whose tops are coupled to each other by spot welding.

It should be noted that this embodiment it not preferred as the welding together of the edges is very critical, furthermore interstice effect may occur and edge stresses and distortion may occur, particularly bending stresses and elongation stresses around the resistance welding zones.

FIG. 4 shows a pressure vessel 15, of which the connecting elements take the form of rods 16. In variance with the embodiment according to FIG. 3, the edges of the walls 17, 18 are coupled with each other by means of a U-shaped profiled member 19.

FIG. 5 shows how the rods 16 can be attached. Clamps 20 are given the form of oblong clampings jaws 21, 22 bearing copper half casings 23, 24 which can fit tightly round the rods 16. After inserting the rods 6 into the casings 23, 24, a clamp 20 is attached between the walls 17, 18, after which a pressure force is exercised by spot weld electrodes 25, 26 corresponding to the arrows 27, 28, and a weld current is transmitted. After the welding of the rods of a clamp 20, the clamp is opened and removed.

FIG. 6 shows how the U-shaped member 19 is attached between the walls 17, 18. A copper block 29 is placed in the U, after which weld rollers 30, 31 are pressed on from the outer surface of the plates 17, 18 and a weld current is transmitted by a power source 32. During the transmission of current the rollers 30, 31 are driven in the direction indicated by arrows 33, 34, whereby the piece of work undergoes displacement corresponding to the arrow 35. The path of the rollers 30, 31 extends over the body of the U-shaped member 19. The smooth weld seam obtained on both sides is indicated by 36 and 37, respectively.

Figure 7:
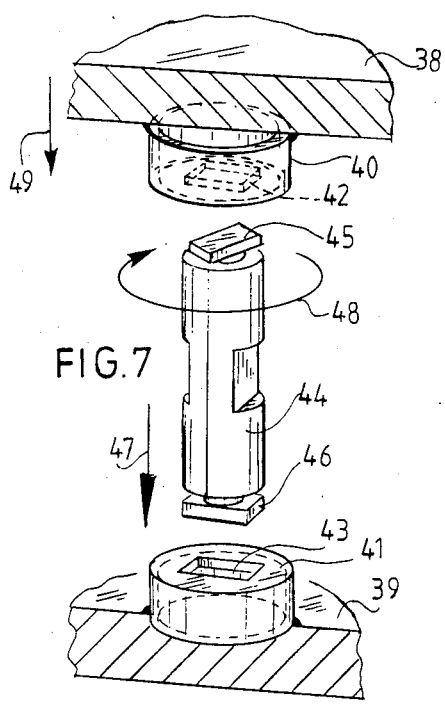
FIG. 7 shows a further example of a connecting element.

FIG. 7 shows two walls 38, 39 having locking members 40, 41 in the form of a box whose upper surface features a rectangular hole 42, 43 for co-operation with a stop part 45, 46 arranged on a rod shaped connecting element 44. The rod 44 is first moved downward(47) and the stop part 46 is introduced into the rectangular hole 43. By mechanical or magnetic means the rod 44 is subsequently rotated as shown by the arrow 48 so that it can no longer be withdrawn and is to some extent at least fixed on the wall 39. The wall 38 is then moved downwards as shown by arrow 49. The stop part 45 has to be rotated according to the arrow 48 such that it assumes the same angle position as the rectangular hole 42 in the locking member 40. After the stop part 45 is introduced into that hole 42, further rotation takes place such that the rod 40 is attached securely tensioned between both walls 38, 39.

Figure 8:
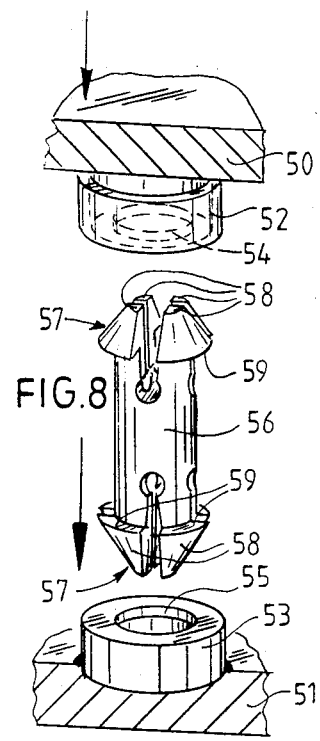
FIG. 8 shows yet another example of a connecting element.

FIG. 8 shows two walls 50, 51 with locking members 52, 53 which differ from the locking members 40, 41 as in FIG. 7 in that their upper wall is provided with round instead of rectangular holes 54, 55. A rod 56 is provided at its ends 57 with four slightly resilient parts 58, each having a stop surface 59 serving as barb for co-operation with the surface round the holes 54, 55. The construction is such that by exerting sufficient force the rod 56 can be coupled with the plates 50, 51 by way of the two snap couplings.

The embodiments according to FIGS. 7 and 8 can be manufactured very practically as follows. The box-shaped locking members 40, 41 and 52, 53, respectively, are brought into register by preliminary positioning of the rod 44 and 56, respectively. Using the conductive sleeves 23, 24 according to FIG. 5 the locking member 40, 41 and 52, 53 can be fixed by welding after which sleeves 23, 24 are removed and the rod 44 by means of rotation and the bar 56 by exerting an axial force is brought into permanent locking.

Figure 9:
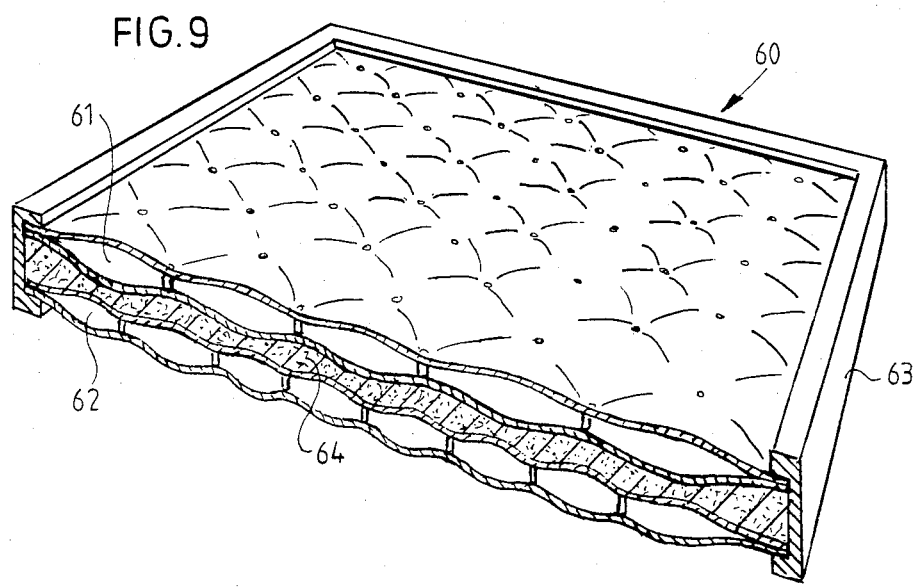
FIG. 9 shows a partially broken away perspective view of an assembly of two thermically coupled storage vessels.

FIG. 9 shows an assembly 60 of two pressure vessels 61, 62 which are bordered by a framework 63. Between the walls of the vessels 61, 62 directed towards each other there is found an intermediate space 64 filled with aluminium powder. This assures an excellent thermic coupling between both vessels.

Figure 10:
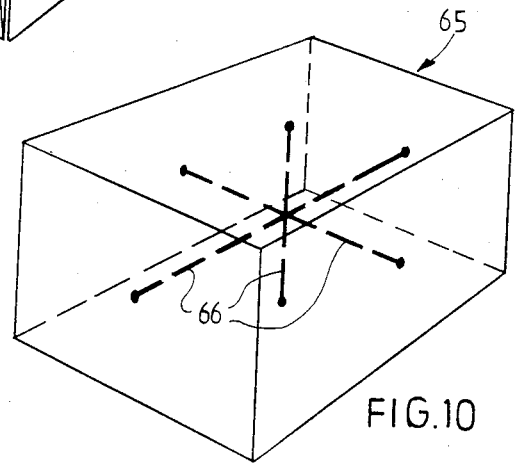
FIG. 10 shows an outline of a parallelepipedal storage vessel.

FIG. 10 shows very schematically a pressure vessel 65 in the form of a block or parallelepiped. Facing walls are connected with each other by rods, which are indicated in general by 66.

Figure 11:
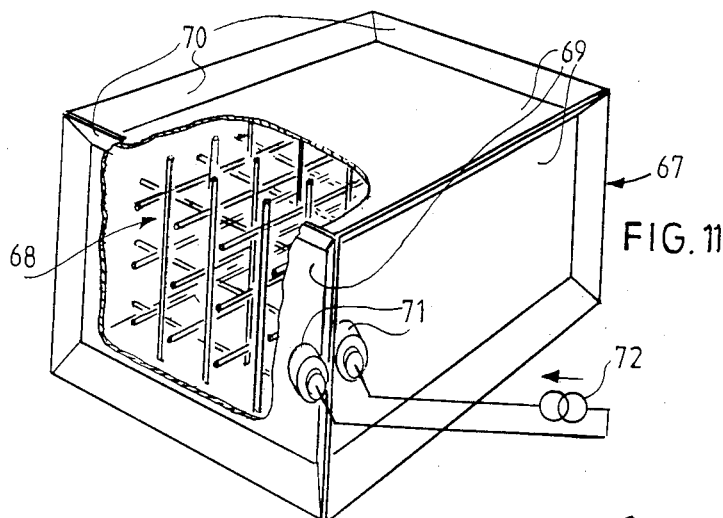
FIG. 11 shows a partially broken away perspective view of a storage vessel during the production thereof.

FIG. 11 shows a vessel 67 with a spatial network, consisting of rods intersecting at some mutual distance, which are indicated in general by 68. The walls 69 are provided with edge zones 70 bent at an angle of about 45°, which are coupled to each other by fold seam welding. The weld rollers concerned 71 and a power source connected with them are indicated schematically.

Figure 12:
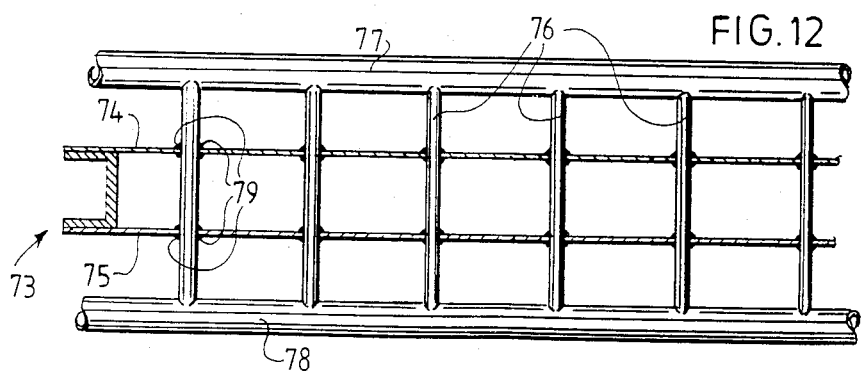
FIG. 12 shows a cross section through a storage vessel serving in addition as heat exchanger, according to the invention.

FIG. 12 shows a storage vessel 73 having walls 74, 75 and connecting elements 76 in the form of pipes which are linked via coupling elements 77, 78 for the passage of heat exchanging fluid. This latter then comes into thermic contact with the fluid found in the vessel 73 via the wall of the pipes 76. The pipes 76 are welded on the walls 74, 75 from the outside of the vessel 73 (79).

Figure 13:
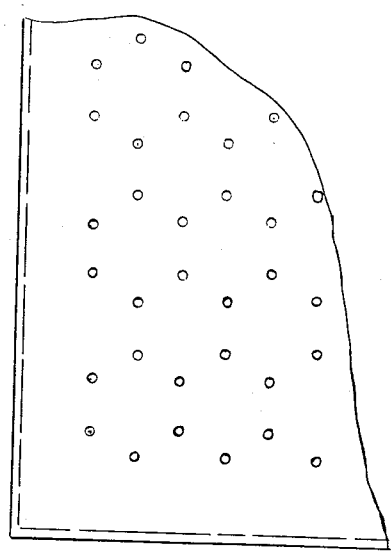
FIG. 13 shows a preferred embodiment of a pattern in which the connecting elements are arranged.

Finally, FIG. 13 shows an hexagonal pattern in which the connecting elements can be placed.

It will be apparent that for application as heat exchanger the pipes also serving as connecting elements can display an enlarged heat exchanging surface, for example in the form of fins, ribs or the like, whether made helical shaped or not. If desired the pipes can also be given the form of heat-pipes. In that case they do not necessarily have to extend outside the walls of the vessel. The heat transfer through the wall will take place generally via the heat pipes.

The invention is not further limited to flat walls or panels, but can also be applied to curved surfaces as well as non-cylindrical bodies. Forms with large empty volumes that are normally difficult to use can also be used effectively in accordance with the invention. By way of example in this context attention is drawn to the application of the invention in the framework of aircraft wings, fuel tanks, storage vessels to be placed between tube banks, polygonal vessels for positioning in corners etc.

I claim:

1. The method of making a pressure vessel which comprises the steps of providing a pair of electrically conducting plates in opposed relation to each other to define opposed surface areas of the plates which are bounded by marginal regions thereof, locating electrically conducting tensile members in a pattern thereof between the plates while adding electrically conductive material in substantially surrounding relation to each of the tensile members, the pattern being distributed over the opposed surface areas of the plates within the confines of the marginal regions of the plates, clamping the plates together to engage the opposed surfaces of the plates both against the opposite ends of the tensile members and against opposite ends of the added electrically conductive material while retaining said pattern and while augmenting the electrical conductivity between the plates through the added electrically conductive material which is in substantially surrounding relation to the tensile members, passing electrical current between the plates to weld the tensile members to the respective plates while the plates are clamped together and the electrical conductivity is augmented between the plates through the added electrically conductive material which is in substantially surrounding relation to the tensile members, terminating the clamping of the plates together, withdrawing the added electrically conductive material from between the plates, and then welding the marginal regions of the plates together to form the pressure vessel.

2. The method as defined in claim 1 wherein the tensile members are composed of sets of two locking members and a rod member therebetween and including the step of further clamping the plates together, after welding of the locking members to the plates has been completed and the added electrically conductive material has been withdrawn but prior to welding the marginal regions of the plates together, to lock the locking members together through the rod members.

3. The method as defined in claim 1 wherein the tensile members are composed of sets of two locking members and a rod member therebetween and including the step of rotating the rod members about their longitudinal axes to effect tensile connection thereof to one of the locking members and then further rotating the rod members about their longitudinal axes to effect tensile connection thereof to the other of the locking members while retaining the tensile connection to the one locking member.

4. In the method of making a pressure vessel, the steps of providing a pair of electrically conducting plates in spaced, opposed relation, interposing a tensile member between the plates so that opposite ends of the tensile member may be forcibly engaged against respective opposed faces of the plates, forcibly engaging the respective plates against the opposite ends of the tensile member and against opposite ends of the casing halves while passing welding current therethrough to spot weld the opposite ends of the tensile member to the respective plates, and then removing the casing halves from surrounding relation to the tensile member and from between the plates.

5. In the method of making a pressure vessel which comprises the steps of providing a pair of electrically conducting plates in opposed relation to each other to define opposed surface areas of the plates which are bounded by marginal regions thereof, interposing a pattern of electrically conducting tensile members between the plates so that opposite ends of the tensile members may be forcibly engaged against the plates, surrounding the tensile members with separable, electrically conducting casing halves made of material which will not spot weld to the plates and so that opposite ends of the casing halves may be forcibly engaged against the respective opposed faces of the plates, forcibly engaging the respective plates against the opposite ends of the tensile member and against opposite ends of the casing halves while passing welding current therethrough to spot weld the opposite ends of the tensile member to the respective plates, and then removing the casing halves from surrounding relation to the tensile member and from between the plates.

6. In the method as defined in claim 5 including the additional step of welding the marginal edge regions of the plates together to form a pressure vessel.

7. In the method as defined in claim 6 wherein the casing halves are made of copper.

8. In the method as defined in claim 5 wherein the casing halves are made of copper.

* * * * *